(12) United States Patent
Niwa et al.

(10) Patent No.: US 6,465,089 B2
(45) Date of Patent: Oct. 15, 2002

(54) SLIDING MATERIAL

(75) Inventors: Takahiro Niwa; Hideki Iwata; Nobutaka Hiramatsu; Takayuki Shibayama, all of Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 09/735,996

(22) Filed: Dec. 14, 2000

(65) Prior Publication Data

US 2001/0016265 A1 Aug. 23, 2001

(30) Foreign Application Priority Data

Feb. 3, 2000 (JP) .......................... 2000/026671

(51) Int. Cl.⁷ .................. F16C 17/12; B32B 15/04; C10M 107/38
(52) U.S. Cl. .................. 428/323; 428/327; 428/328; 428/421; 428/463; 508/100; 508/104; 508/108
(58) Field of Search ............... 428/323, 327, 428/328, 421, 463; 508/100, 103, 104, 108

(56) References Cited

U.S. PATENT DOCUMENTS 5,024,882 A * 6/1991 Matucha et al.

FOREIGN PATENT DOCUMENTS

| DE | 003808912 A1 | * 10/1998 |
| EP | 0340839 | * 4/1989 |
| GB | 1 271 141 | 4/1972 |
| JP | 39-16950 | 8/1939 |

* cited by examiner

Primary Examiner—Deborah Jones
Assistant Examiner—Jennifer McNeil
(74) Attorney, Agent, or Firm—Browdy and Neimark

(57) ABSTRACT

In order to obtain a sliding material which does not include lead particles and is harmless to the environment, there is provided a sliding material which includes, by volume, 3 to 40% bismuth particles but no lead particles, while having a low coefficient of friction and excellent wear resistance.

18 Claims, 2 Drawing Sheets

SLIDING MATERIAL

BACKGROUND OF THE INVENTION

1. Field of the Invention

The present invention relates to a sliding material the base resin of which is polytetrafluoroethylene (hereinafter referred to as PTFE).

2. Description of the Related Art

PTFE is a suitable resin for a sliding material because of its low coefficient of friction and its excellent self-lubricating property, while the wear resistance thereof is not sufficient. Accordingly, there is widely used a sliding material the wear resistance of which is enhanced by mixing a PTFE resin with metal particles, another resin, or the like.

For example, JP-B-39-16950 describes a bearing material wherein a porous copper alloy sintered on a back metal is impregnated and coated with a resin made from PTFE which includes, by volume, 16 to 24% lead particles. Because of including the lead particles, the PTFE resin is improved in wear resistance, particularly under the dry condition.

SUMMARY OF THE INVENTION

However, in recent years, a sliding material which does not include the lead particles also has been desired in view of environmental problems.

Accordingly, in order to develop a sliding material substituting for the conventional sliding material including the lead particles, the present inventors have repeated many trials and errors and as a result of those, found that a sliding material comprising PTFE which includes bismuth particles can substitute for the conventional sliding material including lead particles in view of properties regarding the coefficient of friction and wear resistance, so that the invention had been completed.

According to the invention, in order to achieve the above object, there is provided a sliding material comprising PTFE which includes, by volume, 3 to 40% bismuth particles but no lead particles. Because of not including the lead particles, it is possible to provide a sliding material harmless to the environment.

In case that the content of the bismuth particles is less than 3 volume %, it is not possible to obtain the effect sufficiently improved in wear resistance. On the other hand, in case that the content is 10 to 40 volume %, it is possible to obtain excellent wear resistance, however, in case that the content exceeds 30 volume %, the wear resistance is gradually deteriorated. Thus, the content of the bismuth particles may be from 3 to 40 volume %, preferably from 10 to 30 volume %, and more preferably from 15 to 20 volume %.

The bismuth particles included in the resin are preferably dispersed therein, however, if the particles are too fine, it is difficult to disperse them in PTFE. Thus, it is desirable that the size of the bismuth particles is about 1 to 50 µm.

Since bismuth alloy particles including a metal such as silver, tin, zinc or indium are harder than pure bismuth particles, the bismuth alloy particles can further improve the wear resistance of the sliding material. The content of the metal is preferably from 0.5 to 30 weight %, and more preferably from 5 to 15 weight %.

The sliding material may be used alone for configuring a plain bearing, however, it may be used also for coating a back metal of a plain bearing so as to enhance the mechanical strength thereof. Moreover, after sintering metal powder on the back metal of the plain bearing, the metal powder layer may be impregnated and coated with the sliding material, so that the adhesiveness of the resin layer is improved. Furthermore, a wire netting member or an expanded metal member may be filled and coated with the sliding material to constitute a plain bearing.

By using the resin comprising PTFE which includes, by volume, 3 to 40% bismuth particles, there is provided a sliding material which is excellent in bearing properties such as a coefficient of friction and wear resistance, and harmless to the environment because of not including the lead particles.

Moreover, the bearing properties such as a coefficient of friction and wear resistance can be further improved by replacing the bismuth particles with the bismuth alloy particles.

By using the sliding material according to the invention for a plain bearing, it is possible to provide a plain bearing improved in thermal conductivity, load carrying capacity and wear resistance.

With reference to the attached drawings, preferred embodiments of the invention will be described herein below.

DESCRIPTION OF PREFERRED EMBODIMENTS

Figure 1:
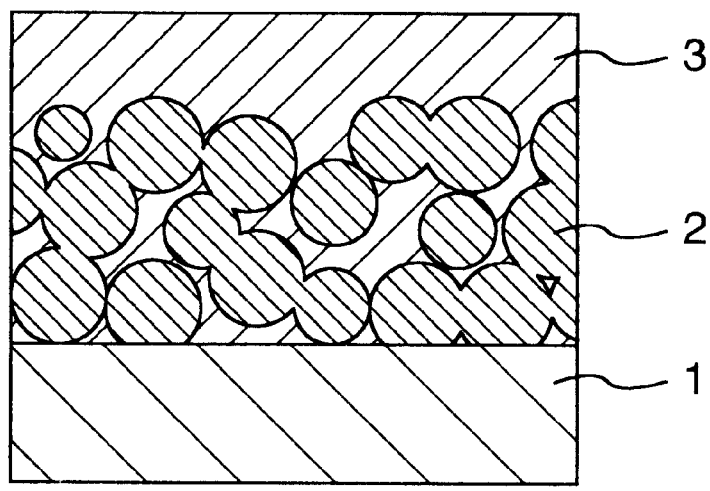
FIG. 1 is a partially enlarged cross sectional view showing an embodiment wherein metal powder is sintered on a back metal, and the back metal is impregnated and coated with a sliding material.

In order to examine the effect of the invention, a test was carried out with respect to a plain bearing having a structure shown in FIG. 1. In the production process of the plain bearing, at first, metal powder (120 mesh or less) made from Cu and 10 weight % Sn is scattered on a back metal 1 so as to attain a thickness of 0.3 mm. The back metal 1 is made of a steel sheet plated with copper and has a thickness of 1.2 mm. Thereafter the metal powder is heated at a temperature of 750 to 900° C. for 10 to 30 minutes for sintering, so that a porous metal layer 2 made from Cu-Sn is formed on the back metal 1.

After the sintering, the metal layer 2 is impregnated and coated with one of resins of samples 1 to 7 and comparison samples 1 to 4 shown in Table 1, the base resin of which is PTFE, and thereafter cured at 350 to 400° C. and subjected to rolling so as to form a resin layer 3, whereby a composite plate having a thickness of 1.5 mm is obtained. The metal powder used in the resin layer 3 is bismuth particles having an average particle size of 15 µm. Moreover, the metal powder used in sample 6 is bismuth alloy particles including 10 weight % silver, and the metal powder used in sample 7 is bismuth alloy particles including 10 weight % tin.

The composite plate is cut into a predetermined size, and then formed into a cylindrical shape having an inner diameter of 20 mm and a width of 20 mm so as to form a test sample which comprises the back metal 1, the porous metal layer 2 sintered on the back metal 1, and the resin layer 3 provided on the inner surface of the porous metal layer 2, as shown in FIG. 1.

TABLE 1

| | Components of Resin Layer | | | Test Results | | |
|---|---|---|---|---|---|---|
| | PTFE | Bi (vol. %) | Others (vol. %) | Co-efficient of friction | Amount Of Wear (μm) | Trans-ferred Membrane |
| Samples | | | | | | |
| 1 | Rest | 5 | — | 0.16 | 30 | Yes |
| 2 | Rest | 10 | — | 0.14 | 26 | Yes |
| 3 | Rest | 20 | — | 0.12 | 25 | Yes |
| 4 | Rest | 30 | — | 0.13 | 26 | Yes |
| 5 | Rest | 38 | — | 0.15 | 28 | Yes |
| 6 | Rest | 20/Bi-Ag | — | 0.12 | 20 | Yes |
| 7 | Rest | 20/Bi-Sn | — | 0.15 | 21 | Yes |
| Comparison samples | | | | | | |
| 1 | Rest | 1 | — | 0.18 | 50 | Yes |
| 2 | Rest | 50 | — | 0.15 | 45 | Yes |
| 3 | Rest | — | 20/Pb | 0.20 | 20 | Yes |
| 4 | Rest | — | 20/Sn | 0.35 | 60 | None |

In order to determine a coefficient of friction and an amount of wear on each sample, tests are carried out under the condition shown in Table 2 using a bushing test machine. The results are also shown in Table 1.

TABLE 2

| | Items | Test condition |
|---|---|---|
| 1. | Peripheral speed | 6.0 m/min |
| 2. | Specific load | 5 MPa |
| 3. | Test time | 100 hrs |
| 4. | Lubricant | No lubricant |
| 5. | Associated shaft: Material | S55C |
| | : Roughness | 1.5 $R_{max}$ μm |
| | : Hardness | $H_v$ 700 |

The results of the tests show a tendency that both the coefficient of friction and the amount of wear decrease in accordance with increase of the bismuth particle content until the content reaches 20 volume %, and increase gradually when the content exceeds 30 volume %.

Moreover, as a result of observing the surface of the associated shaft after the bushing test, transferred membrane made from PTFE is formed in each sample except for comparison sample 4 including 20 volume % tin. In view of the formation of the transferred membrane, it is considered that the PTFE resins are mutually slid between the plain bearing and the associated shaft, so that the coefficient of friction and the wear resistance are improved.

As a result, it becomes clear that a sliding material having an excellent coefficient of friction and excellent wear resistance can be obtained by adding 3 to 40 volume % bismuth particles to PTFE in the case of the dry condition. Furthermore, sample 6 where the bismuth particles are replaced by the bismuth alloy particles including 10 weight % silver and sample 7 where the bismuth particles are replaced by the bismuth alloy particles including 10 weight % tin bring excellent results regarding the coefficient of friction and the wear resistance more than the other samples where pure bismuth particles are included.

Figure 2:
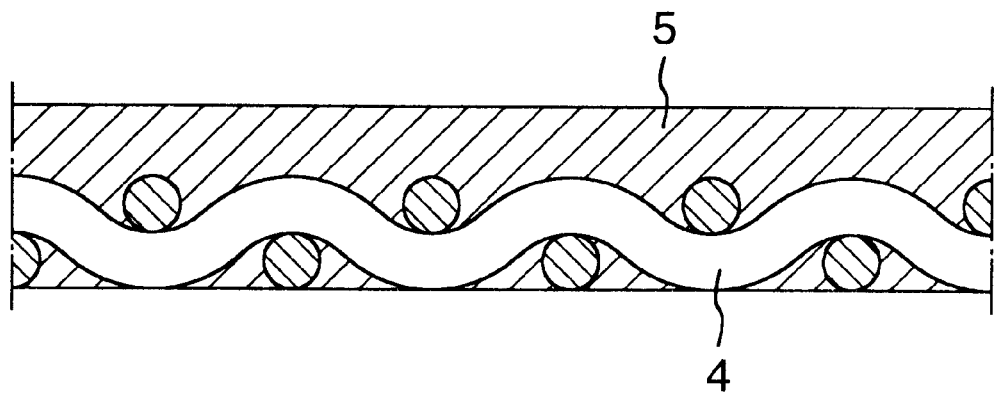
FIG. 2 is a partially enlarged cross sectional view showing an embodiment wherein a wire netting member is filled and coated with a sliding material.
Figure 3:
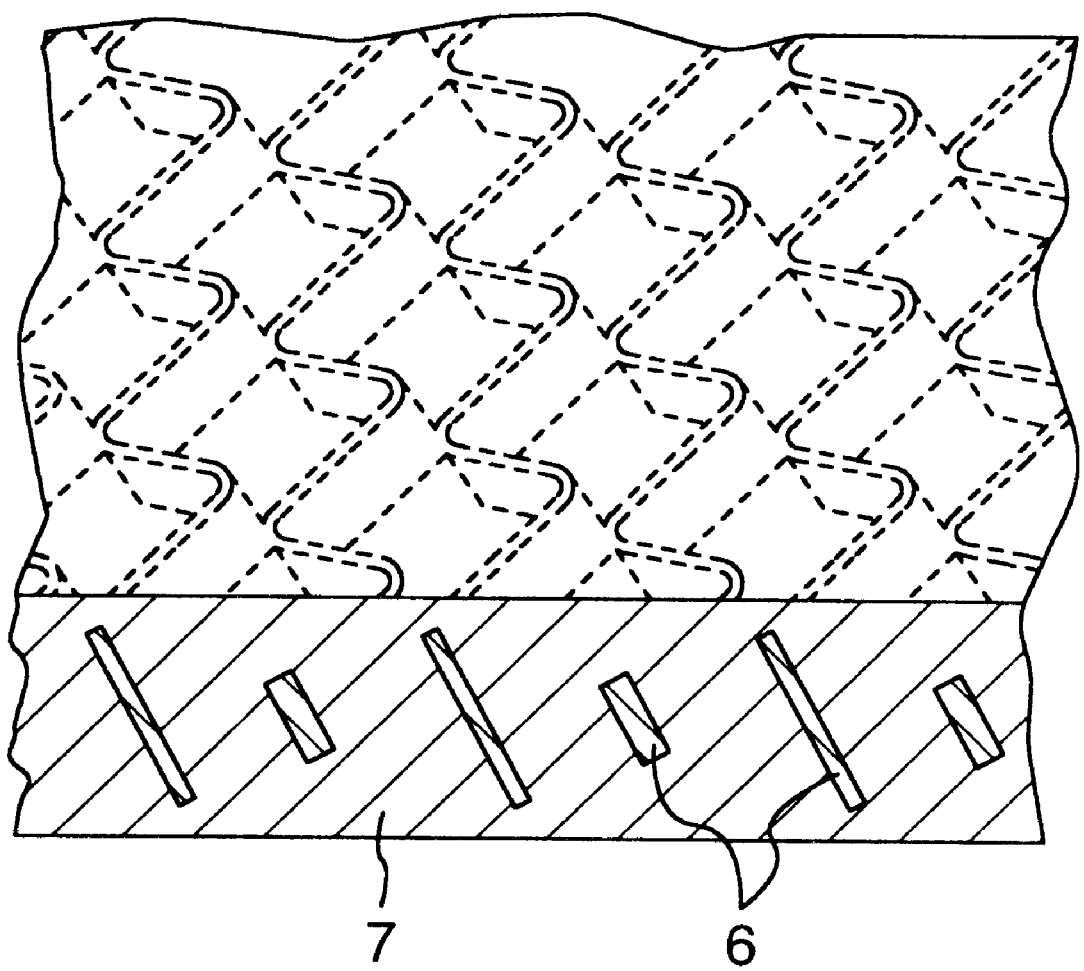
FIG. 3 is a partially enlarged perspective view showing an embodiment wherein an expanded metal member is filled and coated with a sliding material.

Although the foregoing describes a plain bearing which comprises a back metal 1, a metal layer 2 sintered on the back metal 1, and a resin layer 3 formed by a sliding material with which the metal layer 2 is impregnated and coated as shown in FIG. 1, the invention is not limited to the embodiment, but various changes, modifications and variations can be made appropriately within the scope of the invention. For example, the sliding material 7 may configure a plain bearing by itself. Further, it is also possible to fill and coat a wire netting member 4 with the sliding material 5 as shown in FIG. 2 or fill and coat an expanded metal member 6 with the sliding material 7 as shown FIG. 3 to form a sheet material, and thereafter the sheet material is formed into a curved shape for configuring a plain bearing.

What is claimed is:

1. A sliding material consisting essentially of a polytetrafluroethylene resin and 3 to 40% by volume pure bismuth particles, but not lead.

2. A plain bearing comprising a back metal, wherein the back metal is coated with the sliding material according to claim 1.

3. A plain bearing comprising a back metal, wherein the back metal is provided with a metal powder layer sintered thereon, and the metal powder layer is impregnated and coated on a surface thereof opposite said back metal with the sliding material according to claim 1.

4. A plain bearing comprising a wire netting member or an expanded metal number, wherein the wire netting member or the expanded metal member is filled and coated with the sliding material according to claim 1.

5. The bearing according to claim 4 wherein the sliding material contains polytetrafluoroethylene in an amount of at least 60 volume %.

6. The sliding material according to claim 1 wherein the bismuth particles are from about 1 to about 50 microns.

7. The sliding material according to claim 1 wherein the polytetrafluoroethylene is present in an amount of at least 60 volume %.

8. A sliding material consisting essentially of a polytetrafluoroethylene resin and 3 to 40 volume % bismuth alloy particles, and no lead.

9. A plain bearing comprising a back metal wherein the back metal is coated with the sliding material according to claim 8.

10. A plain bearing comprising a back metal, wherein the back metal is provided with a metal powder layer sintered thereon, and the metal powder layer is impregnated and coated on a surface thereof opposite said back metal with the sliding material according to claim 8.

11. A plain bearing comprising a wire netting member or an expanded metal member, wherein the wire netting member or the expanded metal member is filled and coated with the sliding material according to claim 8.

12. The bearing according to claim 11 wherein the sliding material contains polytetrafluoroethylene in an amount of at least 60 volume %.

13. The sliding material according to claim 8 wherein the bismuth alloy parties include a metal selected from the group consisting silver, tin, zinc, and indium.

14. The sliding material according to claim 13, wherein the content of the metal is from 0.5 to 30 weight % of the bismuth alloy particles.

15. The sliding material according to claim 14 wherein the content of the metal is from 5 to 15 weight % of the bismuth alloy particles.

16. The sliding material according to claim 8 wherein the bismuth particles are from about 1 to about 50 microns.

17. The sliding material according to claim 8 wherein the bismuth alloy particles are present in an amount of from 10 to 30 volume %.

18. The sliding material according to claim 17 wherein the bismuth alloy particles are present in an amount of from 15 to 20 volume %.

* * * * *